July 31, 1962   HANS-PETER STREUBER   3,047,278
EXCHANGE DEVICE FOR THE CONTACT OF GASES AND LIQUIDS
Filed Oct. 2, 1958   3 Sheets-Sheet 1

July 31, 1962    HANS-PETER STREUBER    3,047,278
EXCHANGE DEVICE FOR THE CONTACT OF GASES AND LIQUIDS
Filed Oct. 2, 1958    3 Sheets-Sheet 3

United States Patent Office 3,047,278
Patented July 31, 1962

3,047,278
EXCHANGE DEVICE FOR THE CONTACT
OF GASES AND LIQUIDS
Hans-Peter Streuber, Hagdorstr. 46, Hilden,
Rhineland, Germany
Filed Oct. 2, 1958, Ser. No. 764,864
Claims priority, application Germany June 20, 1958
1 Claim. (Cl. 261—114)

This invention relates to exchange devices such as heat exchangers and the like and, more particularly, to devices involving the contact of gaseous media and liquids.

The invention contemplates the situation in which a liquid is passed through a series of channels between which flows a gaseous medium, the gaseous medium being intended to contact the liquid and make an exchange, such as a heat exchange, therewith. It is an object of the invention to provide improved devices relating to conditions wherein one type of medium is brought into contact with a second type of medium.

Briefly the invention contemplates, in accordance with a preferred embodiment thereof, apparatus for controlling the flow of a gas and liquid in an exchange column, said apparatus comprising supports which are spaced by troughs extending therebetween and connecting said supports. The troughs form with the supports arbitrary serpentine paths for the flow of the liquid. Adjacent of the troughs define therebetween passages for the flow of the gas. This gas normally ascends vertically between the troughs. Each trough includes side walls which both confine the flow of liquid and direct the flow of the gas in a vertical direction. However, hoods are employed which encompass adjacent side walls of adjacent troughs in order to deflect the flow of the gas downwardly into the troughs at the sides thereof. The hoods, moreover, define apertures opening into the troughs in a particular manner whereby gas flowing through these apertures imparts to the liquid a determinable direction of flow.

As a feature of the invention, the aforenoted apertures are provided in lower extremities of the hoods and are accompanied by fins, or the like, which direct the flow of gas into the troughs.

As a further feature of the invention, the troughs are subdivided into sections by means of channels extending transversely thereof.

Preferably the troughs are constituted by inverted U-shaped members of equal length which are disposed in parallel. Furthermore, the above noted supports are preferably planar members which are coplanar with the bottoms of the troughs in order to afford uninterrupted planar surfaces supporting the liquid for flow thereupon.

The invention contemplates that the apparatus noted above constitutes an individual plate, a plurality of which may be superposed so as to constitute an exchange column. Where a column is concerned, the invention contemplates the flow of liquid and gas between the superposed plates, the liquid normally flowing downwardly from plate to plate by means provided therefor and the gas ascending vertically from plate to plate through passages defined by the superposed plates.

In one form of the invention, the aforenoted plates are of a polygonal configuration and, in this regard, the plates may be, for example, square or rectangular. The invention, however, contemplates that other forms of plates may be employed such as, for example, round and elliptical plates. In fact, the round type of plates constitutes one of the preferred forms of plates which are provided for in accordance with the invention.

As noted above, the invention contemplates the use of fins positioned adjacent the apertures for purposes of directing the flow of gas through the apertures. These fins are preferably directed obliquely into the troughs so as to impart a longitudinal direction of flow to the liquid in the troughs. As a feature of the invention, these fins are integral with the hoods and may, in fact, be stamped therefrom.

The direction of the fins in the various troughs controls the serpentine path which the liquid is made to follow. In any given trough the fins of adjacent hoods are generally directed in the same direction. In a preferred form of the invention, the fins of adjacent troughs are directed in opposite directions so that in sequentially adjacent troughs the liquid flows in opposite directions. In other words, in a series of parallel troughs, the liquid flows in the same direction in every other trough but in opposite directions in adjacent troughs.

It is also a feature of the invention that the above noted hoods are provided in such a manner as to rest freely upon the troughs with which they are associated. This facilitates maintenance and replacement and provides a structure which is readily constructed or assembled.

The invention advantageously employs a gravitational feed of liquid between superposed plates, thus avoiding the necessity of employing costly and complex equipment. Moreover, the invention provides a ready control of the flow of liquids inasmuch as this is directly and positively controlled by means of hoods which are freely and simply correlated with the desired direction of flow.

Other objects, features and advantages of the invention will be apparent from the following detailed description of preferred embodiments of the invention, as illustrated in the accompanying drawing in which.

Figure 3:
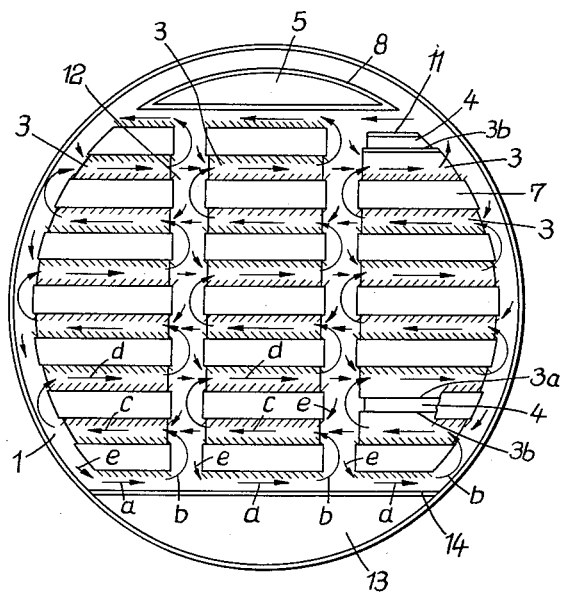
Figure 4:
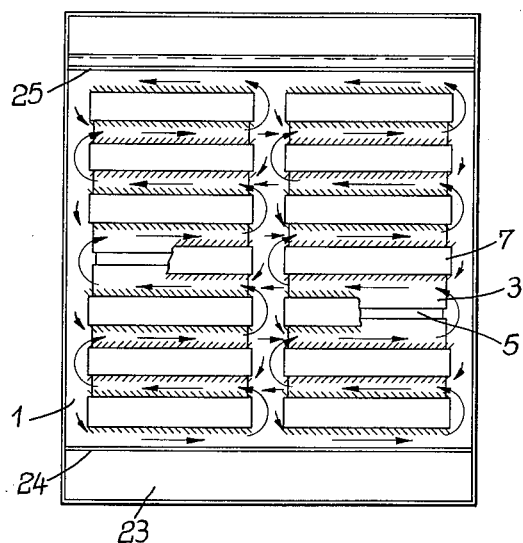

FIG. 3 is a top plan view of a round exchange plate provided in accordance with a further embodiment of the invention, the troughs of this plate being subdivided into separate sections by means of channels extending transversely of the troughs; and FIG. 4 is a top plan view of a further embodiment of the invention, the view illustrating a rectangular plate, the troughs of which are divided into separate sections by a transverse channel.

Figure 1:
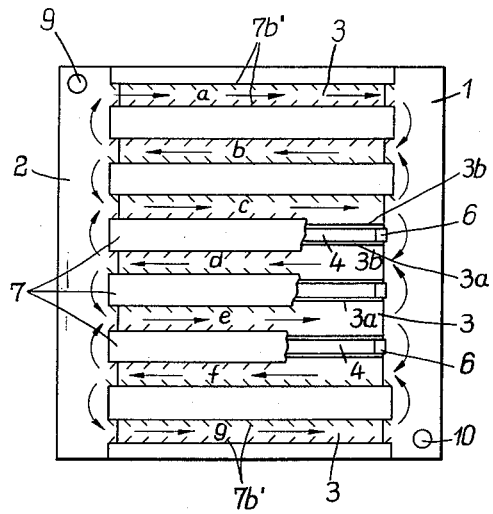
FIG. 1 is a top plan view, partially broken away, of an exchange plate provided for in accordance with one embodiment of the invention.

The exchange plate illustrated in FIG. 1 comprises two lateral manifold supports 1 and 2 which are coplanar members having flat upper surfaces. The supports 1 and 2 are substantially elongated rectangular members which are spaced and disposed in parallel. Intermediate supports 1 and 2 are troughs 3 which are connected to and couple the supports 1 and 2.

Figure 1B:
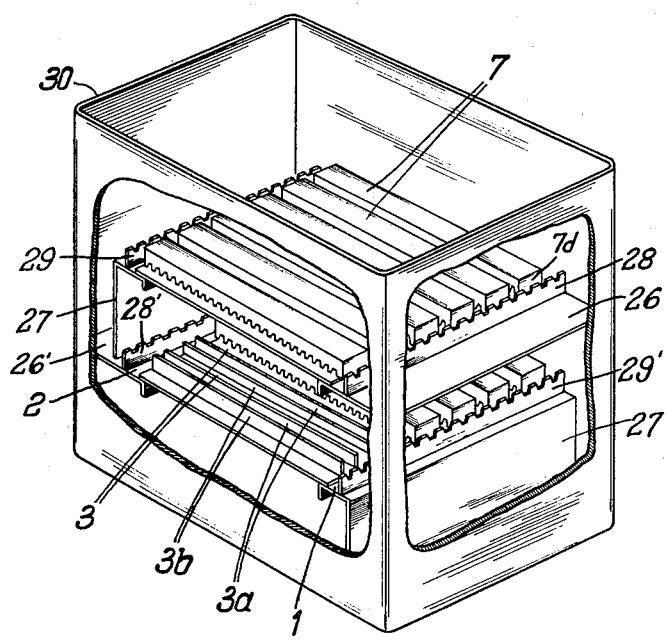
FIG. 1B is a perspective view, partially broken away, of an exchange column device in which are employed two superposed plates of the type indicated in FIGURES 1 and 1A.
Figure 1A:
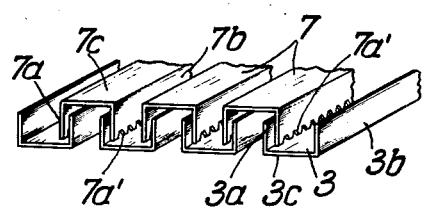
FIG. 1A is a diagrammatic isometric view of a portion of the plate of FIGURE 1, the view indicating how the troughs and hoods are engaged.

With reference to FIGURE 1A it is seen that the troughs 3 are U-shaped members of elongated configurations and that troughs 3 are positioned and spaced in parallel relationship. Each of troughs 3 consist of side walls 3a and 3b which are spaced and parallel and which are connected by a flat bottom wall 3c upon which the liquid flows as will hereinafter be explained.

Referring again to FIGURE 1, it is seen that the troughs 3 define therebetween vertical passages 4 which, as will subsequently become apparent, are passages for the vertical flow of a gaseous medium. Passages 4 exist between all adjacent troughs and, at the outer extremities of these passages and adjacent supports 1 and 2, are positioned intermediate members 6 connected to supports 1 and 2 and serving both as spacing members for the troughs 3 and as blocking members at the ends of passages 4, so as to confine preferably the flow of the gaseous medium to a vertical direction. The ends of the passages between the troughs illustrated in FIGURES 1B, 3 and 4 may be blocked in a similar manner or in a manner known in the art as can be seen in Patents 2,690,332 (FIG. 5), 1,900,085 (angle 4) or in applicant's prior application Serial Number 752,248 (seal 21).

In the embodiment illustrated in FIGURE 1, it is to be noted that the troughs 3 define a series of channels $a$–$g$. These channels are connected by means of supports 1 and 2 to constitute arbitrary serpentine paths for the flow of liquid, the particular paths which the liquid follows being controllable as will be next indicated.

To control the flow of the liquid as contemplated in accordance with the invention there are provided a number of hoods 7 as seen with reference to FIGURE 1A. The hoods 7 are provided with dependent walls 7a and 7b interconnected by an intermediate or upper wall 7c and closed end walls 7d (FIG. 1B). Hoods 7 thus have the configuration of an inverted U-shaped member.

Hoods 7 are supported on the troughs 3 in spaced relation in a manner not shown but which may be similar to that shown in applicant's prior application Serial Number 752,248 or in Patent No. 2,690,332. Each hood encompasses the adjacent side walls of adjacent troughs, such that each hood 7 is freely supported by two adjacent troughs. Accordingly, hoods 7 are readily positioned and replaced in accordance with the requirements of the exchange device comprising the same.

At the lowermost extremities of their side walls, the hoods 7 are provided with a series of apertures 7a'. Adjacent the apertures 7a' are positioned fins 7b'.

Figure 2:
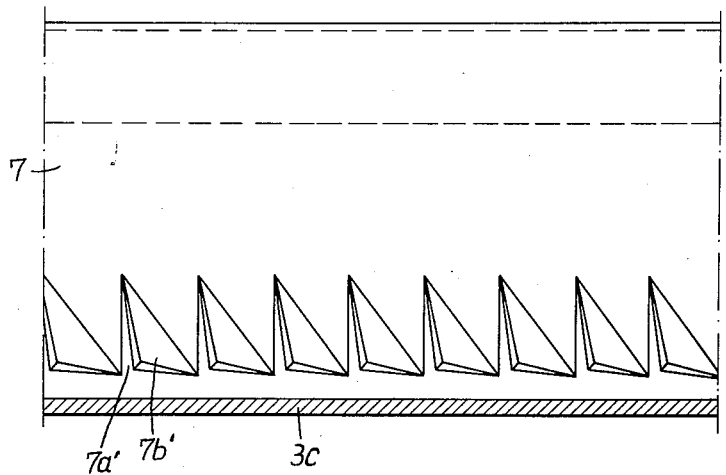
FIG. 2 is a partial side view, partly in section, of a hood and associated trough bottom employed in accordance with the invention, the view indicating the apertures and fins which provide the direction of gas and, consequently, liquid flow.

As seen in FIGURE 2, fins 7b' are integrally formed in the side walls of hoods 7. Fins 7b' are triangular members which are bent in the form of flaps from the side walls of hoods 7 and which extend obliquely therefrom. Furthermore, fins 7b' extend externally of the associated hoods and thus control the flow of gas travelling outwardly from the interior of the hoods. It is to be noted that (see FIG. 1) the fins on opposite side walls of any one hood 7 are directed in opposite directions. It is furthermore seen in FIGURE 1 that, preferably, the fins in any given trough extend generally in the same direction.

In FIGURE 1, the hoods 7 and their associated fins are so positioned that the gas flow in each trough and, consequently, in each channel results in a determinable pattern. As indicated by the arrows in the different channels, liquid flow is in the same direction in channels $a$, $c$, $e$ and $g$. Gas and liquid flow is in the opposite direction as indicated by the arrows in channels $b$, $d$ and $f$. At the outer extremities of the channels, liquid flow is divided at those channels from which the liquid flows and the flow is combined at those channels into which the liquid is entering.

In other words, due to the construction of the illustrated exchange plate, the liquid is guided through the troughs or channels in a particular manner by the gas deflected through apertures 7a' and directed in one or the other of two opposite directions by projections or fins 7b'. Due to the direction of the projections 7b' and consequently the direction of gas flow, liquid flows in channel $a$ in the direction indicated by the arrows therein. The liquid is taken up from the end of channel $a$ by the suction of the adjacent channel $b$ and is guided through the latter to the manifold support or platform 2. The liquid is taken up from the end of channel $b$ by the suction of channels $a$ and $c$. The greater part of the liquid flow is to channel $c$, when an appropriate quantity of liquid has been provided.

The manner in which the liquid travels through the channels can be controlled by means of the quantity of liquid fed to the exchange plate. This liquid is fed to said plate by means of a duct 9, whereupon the liquid is then fed to the adjacent manifold support 2 which constitutes an intake manifold support. Additionally, a duct 10 in a diametrically opposed position is operatively associated with the plate to provide for the gravitational discharge of the liquid. Duct 10 is operatively associated with manifold support 1 whereby the latter constitutes an output manifold support.

The flow pattern indicated above is repeated in channels $d$ to $g$. The liquid flowing through channel $e$ is guided in the direction of the arrows shown in that channel by virtue of the direction of the associated fins 7b'. The remaining flow directions are readily determined.

The travel of liquid on a plate can be considerably lengthened by guiding the liquid several times through each channel. The extent of such lengthening can be arbitrarily controlled. Additionally, the arrangement reliably prevents any channel from being emptied by the force of the gas flow because the less liquid a channel receives, the greater is the force with which liquid is sucked in from adjacent channels. Thus, the invention insures uniform loading and better and more readily controlled utilization of the plates of an exchange column.

FIGURE 1B illustrates one form of an exchange column employing plates provided in accordance with the invention. In FIGURE 1B is seen a casing 30 partially broken away to permit viewing the internal construction of the column. Inside of the casing 30 are seen supports 1 and 2 between which extend troughs 3 having side walls 3a and 3b. As noted above hoods 7 are employed to divert the flow of gas and cause the gas to flow obliquely into the various channels so as to control the flow of liquid.

As seen in FIGURE 1B, the plates are superposed in such a manner that the gas flows upwardly from one plate to another and the liquid flows downwardly from one plate to another plate, conduits 9 and 10 such as illustrated in FIGURE 1 being provided to enable a flow of the liquid between adjacent exchange plates.

The arrangement of the discharges and weirs as seen in FIGURE 1B corresponds basically to a customary arrangement in exchange columns. FIGURE 1B illustrates two vertically-spaced trays which are of exactly the same configuration but which are installed in opposed directions in such a way that the liquid is introduced to the upper trays at the right end 26 then passes over weir 28, through the exchange portion of the tray (i.e. where hoods 7 are located) down to the lower tray. The liquid reaches the lower tray at platform 26' passes over weir 28' and through the lower exchange portion then over weir 29' and wall 27'. The upper edges of weirs 28, 28', 29 and 29' are toothed. Weir 28 limits and unifies the supply of liquid from platform 26 to the upper exchange portion. Weir 29 controls the outflow of liquid from said upper exchange portion. Corresponding weirs 28' and 29' are on the lower tray and function in a similar manner with respect to the lower tray. The lower edge of wall 27 is positioned at a lower level than the upper edge of the weir 28'. This prevents the liquid from the upper tray from flowing directly to the exchange portion of the lower tray. It is of course not necessary in all instances to have the wall 27 extending down below the upper edge of weir 28'.

FIGURE 3 illustrates a further embodiment of the invention wherein like elements are designated by like reference numerals. Thus the exchange plate of FIGURE 3 comprises troughs 3 and hoods 7.

More particularly, the plate illustrated in FIGURE 3 consists of a planar platform which is formed with four large openings of which one opening 5, bounded by a rim 8, is illustrated. The remaining apertures of the plate are traversed by troughs 3 extending in spaced and parallel relation. Troughs 3 define therebetween passages 4 and the troughs 3 are defined by upwardly bent rims 11 which are integral with the platform 1 and contiguous with the aforenoted openings. Hoods 7 rest on rims 11 and extend very nearly to the plate 1 but are slightly spaced therefrom as illustrated in FIGURE 2. The troughs covering the three openings are linearly aligned, the troughs being effectively divided into sections by means of transverse channels 12. Channels 12 lie substantially at the same level as the bases of troughs 3 and are a part of the platform 1.

Segment 13 of platform 1 is separated from the remainder of the platform by means of a weir 14, the upper ridge or edge of which is horizontal and preferably somewhat higher than the upper edge of rim 8. The upper edge of weir 14 may be serrated.

Liquid is fed to section 13 from above and flows over weir 14 to the remainder of platform 1. The gas rises from the bottom through passages or clearances 4 into the interior of hoods 7 and flows through the apertures in the lower edges of the hoods to move the liquid in the troughs. The gas imparts to the liquid a movement corresponding to the direction of the associated fins. Consequently, liquid flowing over the weir 14 first flows in the direction of arrows $a'$, then in the direction of arrows $b'$ and next in the direction of arrows $c'$. The liquid then flows to succeeding troughs as for example shown by arrows $d'$. Alternately, the liquid may be distributed in the manner indicated by arrows $e'$. In other words, the liquid can flow back to a trough through which it has previously traveled.

Since the troughs 3 are subdivided by channels 12 the liquid is given the possibility of moving along many different paths in accordance with the suction present at the mouths of the various troughs. This, in turn, is dependent at least in part upon the speed and flow of the liquid through the plate and thus upon the quantity of liquid introduced into section 13 and removed via opening 5.

In the arrangement according to FIGURE 4, the liquid is fed to a section 23 of the plate which is separated by a weir 24. The liquid flows over a weir 25 to the next lower plate.

The plate 1 has two large apertures which are traversed by the troughs 3 which are engaged by hoods 7 in the manner indicated above. The arrangement is in other respects similar to that shown in FIGURE 3.

Situated between the troughs 3 are clearances 5 through which gases or vapors rise to be deflected into the troughs 3 in order to control the flow of the liquid. In this arrangement, possibilities of distribution of liquid flow are similar to those described with respect to the structure illustrated in FIGURE 3.

In summary, the invention provides improvements in exchange devices whereby the flow of one type of medium is readily controlled by the utilization of a second type of medium. Apparatus provided in accordance with the invention is economically manufactured and easily assembled. Notwithstanding the economy which the invention affords, there is provided a type of control which has not heretofore been provided in devices of this type. Various features of the invention have been indicated above which contribute their respective values to the benefit of the invention.

There will now be obvious to those skilled in the art many modifications and variations of the structures and methods set forth. These modifications and variations will not, however, depart from the scope of the invention as defined in the following claim.

What is claimed is:

In apparatus for controlling the flow of gas and liquid in exchange relationship, a tray comprising:
separate spaced intake and output manifold supports,
spaced rectilinear troughs extending between the manifold supports and defining a plurality of parallel passages connecting the manifold supports to each other for the flow of liquid in parallel from each manifold to the other,
means for admitting liquid to the intake manifold support,
means for removing liquid from the output manifold support,
each trough including upstanding spaced parallel side walls,
the side walls of adjacent troughs defining therebetween openings for the admission of gas therethrough,
rectilinear hoods covering the gas admission openings and encompassing the adjacent side walls of adjacent troughs,
each hood including closed end walls extending downwardly toward the manifold supports and spaced parallel side walls extending into adjacent troughs,
only the side walls of said hoods including fins having apertures therebetween for enabling the flow of gas out of said hoods into said troughs,
and the fins on respective side walls of each hood being inclined in opposite directions longitudinally of said hood and the fins on respective side walls of adjacent hoods extending into a same trough being inclined in a same direction longitudinally of said trough,
whereby the flow of gas in a trough causes flow of liquid therethrough in the direction of fin inclination and the flow of liquid extends in opposite directions in successive troughs and in parallel from one manifold support to the other in alternate troughs.

References Cited in the file of this patent

UNITED STATES PATENTS

| | | |
|---|---|---|
| 1,114,843 | Wright | Oct. 27, 1914 |
| 1,900,085 | Wallis | Mar. 7, 1933 |
| 2,164,080 | Peters | June 27, 1939 |
| 2,690,332 | Jorgensen | Sept. 28, 1954 |
| 2,737,377 | Huggins et al. | Mar. 6, 1956 |
| 2,753,166 | Bergman | July 5, 1956 |
| 2,862,697 | Zuiderweg et al. | Dec. 2, 1958 |

FOREIGN PATENTS

| | | |
|---|---|---|
| 19,868 | France | June 15, 1915 |
| | (Addition to No. 469,979) | |
| 629,086 | Germany | Apr. 22, 1936 |
| 765,304 | Great Britain | Jan. 9, 1957 |